United States Patent [19]
Geisberger

[11] Patent Number: 5,268,496

[45] Date of Patent: Dec. 7, 1993

[54] PROCESS FOR THE PREPARATION OF POLYSILAZANES

[75] Inventor: Gilbert Geisberger, Altötting, Fed. Rep. of Germany

[73] Assignee: Wacker-Chemie GmbH, Munich, Fed. Rep. of Germany

[21] Appl. No.: 51,981

[22] Filed: Apr. 26, 1993

[30] Foreign Application Priority Data

May 27, 1992 [DE] Fed. Rep. of Germany ....... 4217579

[51] Int. Cl.$^5$ .................. C07F 7/10; C08G 77/06; C08G 77/04; C08G 77/12
[52] U.S. Cl. .................. 556/412; 528/21; 528/28; 528/31; 528/33
[58] Field of Search .............. 556/412; 528/21, 28, 528/33, 31

[56] References Cited

U.S. PATENT DOCUMENTS

| | | | |
|---|---|---|---|
| 3,393,218 | 7/1968 | Van Wazer et al. | 556/412 |
| 3,467,686 | 9/1969 | Creamer | 556/412 |
| 3,809,713 | 5/1974 | Boersma et al. | 556/412 |
| 4,482,669 | 11/1984 | Seyferth et al. | 528/28 X |
| 4,745,205 | 5/1988 | Haluska | 556/412 |
| 4,778,907 | 10/1988 | Gallo | 556/412 |
| 4,992,523 | 2/1991 | Bacque et al. | 528/33 X |
| 5,008,423 | 4/1991 | Gerdau et al. | 528/31 X |

*Primary Examiner*—Paul F. Shaver

[57] ABSTRACT

The invention relates to a process for preparing polysilazanes, which comprises (a) reacting a disilane of the general formula $Me_{6-n}Si_2Cl_n$ in which n is 3 or 4, with an amine of the general formula $RNH_2$, in which R represents an alkyl or aryl radical, in an inert atmosphere at temperatures in the range of from −80° C. to 100° C., (b) reacting the reaction product from (a) with a dicholorosilane of the general formula $R'_2SiCl_2$, in which the radical R', is the same or different and represents a hydrogen atom, an alkyl, allyl or aryl radical, or tetramethyldichlorodisilane in an inert atmosphere at temperatures in the range of from −20° C. to 150° C. and (c) reacting the reaction product from (b) with ammonia in an inert atmosphere and thereafter separating off the ammonium chloride thus formed.

10 Claims, No Drawings

PROCESS FOR THE PREPARATION OF POLYSILAZANES

The invention relates to a process for the preparation of polysilazanes.

BACKGROUND OF THE INVENTION

Polysilazanes are generally known and are used in particular as intermediates for silicon carbonitride and silicon nitride moldings. For example, EP-A-235 486 describes a process for preparing polysilazanes in which the product obtained from the reaction of $R_3SiCl$, $R_2SiCl_2$ or $R_4Si_2Cl_2$ with an amine is reacted with organotrichlorosilanes and then again with an amine. A disadvantage of this process is that the polysilazanes have relatively low thermal stability, i.e., the polymers are highly crosslinked by subsequent crosslinking and may become insoluble and infusible during preparation or during storage. The resultant polysilazanes are unsuitable for a shaping process, such as, for example, fiber spinning.

Therefore, it is an object of the present invention to provide a process for preparing polysilazanes which have good thermal stability. A further object of the present invention is to provide a process for preparing polysilazanes which are suitable for fiber spinning.

SUMMARY OF THE INVENTION

The foregoing objects and others which will become apparent from the following description are accomplished in accordance with this invention, generally speaking by providing a process for preparing polysilazanes, which comprises (a) reacting a disilane of the general formula $Me_{6-n}Si_2Cl_n$ in which n is 3 or 4, with an amine of the general formula $RNH_2$, in which R represents an alkyl or aryl radical, in an inert atmosphere at temperatures in the range of from $-80°$ C. to $100°$ C., (b) reacting the reaction product from (a) above, with a dichlorosilane of the general formula $R'_2SiCl_2$, in which the radical $R'$, is the same or different and represents a hydrogen atom, an alkyl, allyl or aryl radical, or tetramethyldichlorodisilane in an inert atmosphere at temperatures in the range of from $-20°$ C. to $150°$ C. and (c) reacting the reaction product from (b) with ammonia in an inert atmosphere and thereafter separating off the ammonium chloride thus formed.

DESCRIPTION OF THE INVENTION

Disilanes used in this invention and having the general formula $Me_{6-n}Si_2Cl_n$ in which n is 3 or 4, are 1,1- and 1,2-dimethyltetrachlorodisilane, 1,1,1- and 1,1,2-trimethyltrichlorodisilane or mixtures thereof.

In a preferred embodiment of the process of this invention, the high-boiling fraction from the distillation residue of the Rochow synthesis of dimethyldichlorosilane having the approximate composition $Me_{2.6}Si_2Cl_{3.4}$ is used (W. Noll, Chemistry and Technology of Silicones, Academic Press Inc., Orlando 1968, pages 26/27). The residue generally consists of the following components: 1,1,2-trimethyl-1,2,2,-trichlorodisilane and 1,2-dimethyl-1,1,2,2-tetrachlorodisilane.

Amines of the general formula $RNH_2$, in which R represents alkyl or aryl radicals and more preferably methyl, ethyl, n-propyl, isopropyl, n-butyl, sec-butyl, n-hexyl, cyclohexyl, n-hexadecyl, phenyl or tolyl, are used individually or in admixture.

In particular, methylamine or a mixture of methylamine with an additional amine of the above general formula is used. If mixtures are used, the molar ratio of methylamine to the additional amine is preferably in the range of from 9:1 to 9.9:0.1. In a further embodiment of the process of this invention, the disilane from (a) is used as a mixture with trichlorosilane of the general formula $R''SiCl_3$, in which $R''$ represents a hydrogen atom or an alkyl, allyl or aryl radical. Preferred molar ratios of disilane from (a) to trichlorosilane are in the range of from 10 to 0.5, and more preferably from 3 to 1.

Examples of trichlorosilanes of the general formula $R''SiCl_3$ are trichlorosilane, methyltrichlorosilane, ethyltrichlorosilane, vinyltrichlorosilane, propyltrichlorosilane and phenyltrichlorosilane, as well as mixtures thereof.

In this invention, an inert atmosphere means an essentially oxygen-free and anhydrous atmosphere. Examples of inert atmospheres are nitrogen and argon. The reaction of the disilanes from (a), or as a mixture with a trichlorosilane of the general formula $R''SiCl_3$ and the amine $RNH_2$, is carried out in an inert atmosphere at from $-80°$ C. to $100°$ C., preferably from $20°$ C. to $60°$ C. The chlorosilanes are preferably dissolved in a dry, i.e., substantially anhydrous, solvent which does not react with the chlorosilane, such as, for example, aromatics, for example toluene, hydrocarbons, for example petroleum ether or hexane, ethers, for example diethyl ether or methyl tert-butyl ether, or chlorinated hydrocarbons, and the amine is added in the gaseous or in the liquid state. The reaction is preferably carried out at the pressure of the surrounding atmosphere, i.e., 1,080 hPa or about 1,080 hPa.

The reaction of chlorosilanes with an amine gives hydrogen chloride, which can be trapped by other nitrogen-containing compounds, preferably by tertiary amines, such as triethylamine, pyridine or urea. In this case, the amine from (a) which is used in this invention is preferably employed in equimolar amounts, based on the chlorine content of the chlorosilanes present in the reaction mixture.

It is preferred however, that the amine used in this invention is also an HCl acceptor. Here, the amines are preferably added in amounts such that the number of nitrogen atoms is twice the number of chlorine atoms of the chlorosilane compounds used. The reaction products from (a), if necessary, are freed from resulting amine hydrochloride by filtration or centrifugation, are reacted according to (b) with dichlorosilanes of the general formula $R'_2SiCl_2$, in which the radicals $R'$, which may be the same or different, each represent a hydrogen atom or an alkyl, allyl or aryl radical or tetramethyldichlorodisilane, i.e., 1,1,2,2- and/or 1,1,1,2-tetramethyldichlorodisilane, in an inert atmosphere at the pressure of the surrounding atmosphere and at temperatures in the range of from $-20°$ C. to $150°$ C., to crosslink the oligomeric aminodisilanes or aminodisilane/aminosilane mixtures.

Examples of dichlorosilanes of the general formula $R'_2SiCl_2$ are dichlorosilane, methyldichlorosilane, dimethyldichlorosilane, vinylmethyldichlorosilane, ethylmethyldichlorosilane, n-octylmethyldichlorosilane and n-octadecylmethyldichlorosilane, as well as mixtures thereof. Preferred molar ratios of the amount of disilane and, where relevant, trichlorosilane which is used from (a) to dichlorosilane are in the range of from 10 to 0.5, and more preferably from 7 to 2.

The temperature is preferably 0° to 100° C., depending on the silane composition and on the desired degree of crosslinking. Gaseous ammonia in amounts up to not more than four times the equimolar amount of dichlorosilane used is subsequently passed in at temperatures of, preferably from 0° C. to 60° C. until no additional ammonia is absorbed by the reaction solution. The ammonium hydrochloride formed is separated off, for example, by filtration or centrifugation and the filtrate is, if necessary, freed from the solvent by distillation.

If the polysilazane remaining as a residue is liquid at temperatures in the range of from 15° to 25° C., it can, after low-boiling oligomers have been distilled off in vacuo (pressure from $10^5$ to 1 Pa), be converted thermally at temperatures from 100° to 400° C., and more preferably from 150° to 250° C., into polysilazanes having higher degrees of condensation and melting points between 50° and 200° C., and more preferably from 100° to 150° C.

The polysilazanes prepared according to the process of this invention preferably have the following parameters:

| | |
|---|---|
| Molecular weight: | 1,000–10,000 g/mol, and more preferably 2,000–5,000 g/mol. |
| Ceramic yield: | 40–80% by weight, and more preferably 60–75% by weight. |
| Melting point: | <200° C., preferably 100–150° C. |

Polysilazanes have a large number of applications, such as, for example, those described in M. Peuckert, T. Vaahs and M. Brück, Adv. Mater. 2 (1990) 398.

The polysilazanes prepared according to this invention have particular advantages when used in the field of fibers, coatings and matrices based on silicon carbide/nitride.

The preparation of fibers based on silicon carbide/nitride is described, for example, in J. Lipowitz, Ceramic Bulletin; Vol. 70 (1991) 1888 or B. G. Penn, F.E. Ledbetter III, J.M. Clemons and J.G. Daniels, J. of Applied Polymer Science; Vol. 27 (1982) 3751, which are incorporated herein by reference.

In this process, the polysilazane resin is generally spun from the melt to give polysilazane fibers. These fibers can be rendered infusible by a crosslinking step and can be pyrolyzed under an inert gas atmosphere, such as nitrogen or noble gases, or in vacuo, to form high-strength inorganic fibers based on $SiC/Si_3N_4$. Crosslinking can be effected by partial elimination of the amino groups by hydrolysis in air by the atmospheric humidity or by means of steam, by partial or complete replacement of the alkylamino groups by ammonia, hydrazine or ethylenediamine by catalytic crosslinking by means of acetylene or by means of alkanedienes or alkanediynes and other divinyl or polyvinyl or diallyl or polyallyl compounds or by partial removal of amine by heating in vacuo. Other than the first crosslinking method, the last three methods introduce no oxygen into the polymer and hence no $SiO_2$ into the fiber. The crosslinking by means of ammonia has the advantage that the carbon content of the polymer and hence that of the ceramic fiber is reduced. At the same time, the ceramic yield in the pyrolysis of the fibers can thus be increased. Instead of being effected in an inert gas atmosphere, the pyrolysis may also be carried out in the presence of reactive gases, such as ammonia or hydrogen. When ammonia is used as the reactive gas, white $Si_3N_4$ fibers are thus formed, and when hydrogen is used as the reactive gas, it is also possible, by eliminating the C components in the polymer, to obtain $Si_3N_4$ fibers. These $Si_3N_4$ fibers have different shades which range from black to golden yellow to white, depending on the duration of pyrolysis and the pyrolysis time as well as on the hydrogen concentration.

The fibers can be used for reinforcing glass, glass ceramic, ceramic, metals and plastics in the form of short fibers or long fibers. The production of coatings and matrices based on silicon carbide/nitride is described, for example, in K. E. Gonsalves, R. Yazici and S. Han; J. Mater. Sci. Lett. 10 (1991) 834, and S. T. Schwab, R. C. Graef, D. L. Davidson and Y. Pan; Polym. Prepr. 32 (1991) 556, which are incorporated herein by reference.

The polysilazane resins are suitable in particular for coating various substrates, for example as a baking finish for metals and for ceramic substances. Prevention of oxidation of readily oxidizable materials, such as graphite, glassy carbon, CFC or boron, is possible to a certain extent.

Porous materials of ceramic or metals can also be sealed by melt impregnation or solution impregnation. Furthermore, the polysilazane can be used as a binder in the preparation of porous or impermeable ceramic materials, for example in the sintering of oxide powders or of carbide, nitrides, borides, silicides or sialones.

Depending on the pyrolysis conditions, pyrolysis of the polysilazanes gives $SiC/Si_3N_4$ powders or $Si_3N_4$ powders which can be sintered in the presence of sintering assistants to give compact bodies.

Since gases escape during the pyrolysis of the polysilazanes, it is also possible to produce an expanded ceramic which can be used predominantly as heat insulating material or as a filter for molten metals.

Furthermore, ceramic fibers, for example $Al_2O_3$ or SiC fibers or whiskers, can be impregnated with the polysilazanes so that a fiber-reinforced ceramic is obtained from the pyrolysis.

EXAMPLE 1

In a 4 liter three-necked flask having a reflux condenser and gas inlet tube, 300 g of a methylchlorodisilane mixture consisting of 1,1,2-trimethyl-1,2,2-trichlorodisilane and 1,2-dimethyl-1,1,2,2-tetrachlorodisilane of the approximate composition $Me_{2.6}Si_2Cl_{13.4}$, obtained from the high-boiling fraction of the Rochow synthesis of dimethyldichlorosilane, were dissolved in 2000 ml of toluene under an inert gas. Gaseous methylamine is subsequently passed in until no additional gas reacted, the temperature of the reaction solution increasing to 50° C. during this procedure. After cooling, the methylamine hydrochloride was filtered off and washed thoroughly with 100 ml of toluene.

About 42 g of methyldichlorosilane were added to the aminolysate obtained, and the reaction mixture was kept at 40° C. for 2 hours. Ammonia was then passed in until no further gas was absorbed. The ammonium chloride formed was filtered off and the solvent was removed from the filtrate. The residue obtained was an oily substance which, after heating at 250° C. for 4 hours and stripping off low-boiling product components in vacuo, gave 262 g (58% by weight, based on Si used) of a polysilazane melting at 95° C. The gel chromatogram showed that a monomodal molecular weight distribution with a maximum at 1500 g/mol was present.

(Elemental analysis: C 33.4% by weight, H 8.4% by weight, N 15.9% by weight, Si 40.2% by weight; $^1$H-NMR NMe/SiMe/SiH:30/100/5).

EXAMPLE 2

Using a procedure similar to Example 1, a mixture containing 300 g of methylchlorodisilanes having the composition $Me_{2.6}Si_2Cl_{3.4}$ and 100 g of trichlorosilane was dissolved in 3 l of toluene and reacted with methylamine until no additional gas was absorbed by the solution. About 50 g of dimethyldichlorosilane were added to the reaction mixture and heating was carried out for 2 hours at 60° C., after which ammonia was passed in until no additional gas was absorbed by the solution. The ammonium hydrochloride formed was separated off and the filtrate was freed from the solvent in vacuo. About 260 g of a yellowish, oily aminodisilane mixture were obtained as a residue (elemental analysis: Si 37.0% by weight, C 32.4% by weight, H 8.3% by weight, N 20.3% by weight; gel chromatogram: 1,000–5,000 g/mol; ceramic yield: 60% by weight, based on aminodisilane used). After heating for 5 hours at 250° C. and distilling off a small amount of low-boiling, oligomeric aminodisilanes at a pressure of $2 \cdot 10^3$ Pa, this aminodisilane mixture gave 188 g (yield 72% by weight, based on Si used) of a polysilazane melting at 105° C. (elemental analysis: Si 41.6% by weight, C 27.3% by weight, H 7.9% by weight, N 20.3% by weight; gel chromatogram: maximum at 5,000 g/mol with shoulder at 1,000 g/mol; $^1$H-NMR NMe/SiMe/SiH: 83/100/19; ceramic yield; 68% by weight, based on polysilazane used).

Fibers having a diameter of 20 μm could be spun from the melt of this polymer at 110° C. After storage in the air for one day, the fibers were pyrolyzed both discontinuously (in an alumina boat) and continuously in a tubular furnace under argon at up to 1250° C., silicon carbonitride fibers having high strength were obtained (fiber diameter: 13–16 μm; analysis: Si 50.8% by weight, C 17.0% by weight, N 19.8% by weight, O 12.0% by weight; tensile strength 2.0 - 2.5 GPa; modulus of elasticity: 200 GPa; specific resistivity $10^6$ ohm.cm; no weight loss under argon up to 1450° C.; 1% weight loss at 1500° C. in 10 hours; fiber remained amorphous up to 1400° C. and crystallization of β-SiC occurred at higher temperatures).

EXAMPLE 3

Using the procedure described in Example 1, a mixture containing 200 g of methylchlorodisilanes having the composition $Me_{2.6}Si_2Cl_{3.4}$ and 133 g of trichlorosilane was dissolved in 1.5 l of toluene, 10 g of n-hexadecylamine were added and the mixture was reacted with methylamine until no additional gas was absorbed by the solution. After removal of the precipitate, the filtrate was heated for 2 hours with 40 g of dimethydichlorosilane at 60° C., after which ammonia was passed in until no additional gas was absorbed by the solution. The ammonium hydrochloride formed was separated off and the filtrate was freed from the solvent in vacuo. About 196 g of a yellowish, oily aminodisilane mixture were obtained as a residue. After heating for 3 hours at 200° C. and distilling off a small amount of low-boiling, oligomeric aminodisilanes in vacuo, 166 g (yield 69% by weight, based on Si used) of a polysilazane melting at 105° C. were obtained (elemental analysis: Si 36.7% by weight, C 30.1% by weight, H 8.5% by weight, 2000 g/mol; $^1$H-NMR NMe/SiMe/SiH: 100/99/27; ceramic yield 50% by weight, based on polysilazane used).

EXAMPLE 4

Using the procedure described in Example 1, a mixture containing 300 g of methylchlorodisilanes having the composition $Me_{2.6}Si_2Cl_{3.4}$ and 100 g of vinyltrichlorosilane was taken up in 1.5 l of toluene and reacted with methylamine until no additional gas was absorbed by the solution. About 50 g of methyldichlorosilane were added dropwise to the reaction mixture and stirring was carried out for 2 hours at 40° C. Ammonia was then passed through the solution until the solution was completely saturated. The Ammonium hydrochloride formed was separated off and the filtrate was freed from the solvent and low-boiling aminosilanes at a temperature up to 120° C. and a pressure of $10^5$ to $10^3$ Pa. About 210 g (yield 67% by weight, based on Si used) of a yellowish, polysilazane melting at 70°–80° C. remained as a residue (elemental analysis: Si 33.6%, C 35.1%, N 18.5%, H 8.6%; gel chromatogram: broad molecular weight distribution from 1,000 to 6,000 g/mol; ceramic yield; 47% by weight, based on polysilazane used).

What is claimed is:

1. A process for preparing polysilazanes, which comprises (a) reacting a disilane of the general formula $Me_{6-n}Si_2Cl_n$ in which n is 3 or 4, with an amine of the general formula $RNH_2$, in which R is an alkyl or aryl radical, in an inert atmosphere at temperatures in the range of from −80° C. to 100° C., (b) reacting the reaction product from (a) with a dichlorosilane of the general formula $R'_2SiCl_2$, in which the radical R', is a hydrogen atom, an alkyl, allyl or aryl radical or tetramethyldichlorodisilane in an inert atmosphere at temperatures in the range of from −20° C. to 150° C., (c) reacting the reaction product from (b) with ammonia in an inert atmosphere and thereafter separating off ammonium chloride.

2. The process of claim 1, in which the amine of the general formula $RNH_2$, in which R is a methyl, ethyl, n-propyl, isopropyl, n-butyl, sec-butyl, n-hexyl, cyclohexyl, n-hexadecyl, phenyl or tolyl radical is used individually or as a mixture.

3. The process of claim 1, in which methylamine or a mixture containing methylamine and an additional amine of the general formula $RNH_2$, in which R is methyl, ethyl, n-propyl, isopropyl, n-butyl, sec-butyl, n-hexyl, cyclohexyl, n-hexadecyl, phenyl or tolyl radical is used.

4. The process of claim 1, in which the disilane from (a) is mixed with a trichlorosilane of the formula $R''SiCl_3$, in which R'' is a hydrogen atom, an alkyl, allyl or aryl radical.

5. The process of claim 4, in which the molar ratio of disilane from (a) to trichlorosilane is in the range of from 10 to 0.5.

6. The process of claim 4, wherein the trichlorosilane is trichlorosilane, methyltrichlorosilane, ethyltrichlorosilane, vinyltrichlorosilane, propyltrichlorosilane and phenyltrichlorosilane or mixtures thereof.

7. The process of claim 1, in which the dichlorosilane is dichlorosilane, methyldichlorosilane, dimethyldichlorosilane, vinylmethyldichlorosilane, ethylmethyldichlorosilane, n-octylmethyldichlorosilane and n-octadecylmethyldichlorosilane or mixtures thereof.

8. The process of claim 4, wherein the molar ratio of disilane and optionally trichlorosilane (a) to dichlorosilane is in the range of from 10 to 0.5.

9. A polysilazane obtained from the process of claim 1.

10. A polysilazane which has the following parameters:

| | |
|---|---|
| Molecular weight: | 1,000–10,000 g/mol |
| Ceramic yield: | 40–80% by weight, |
| Melting point: | <200° C. |

* * * * *